Oct. 3, 1961    W. C. HALLGREN    3,002,773
ADJUSTABLE OFFSET KEY ASSEMBLY
Filed Dec. 9, 1958
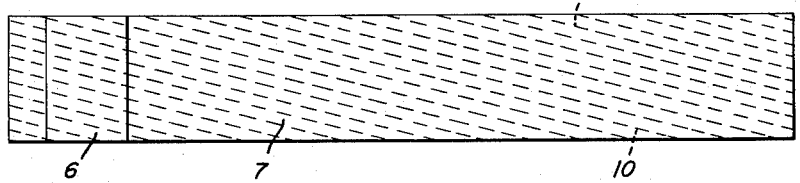
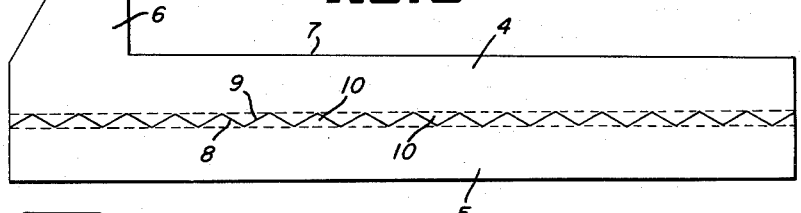
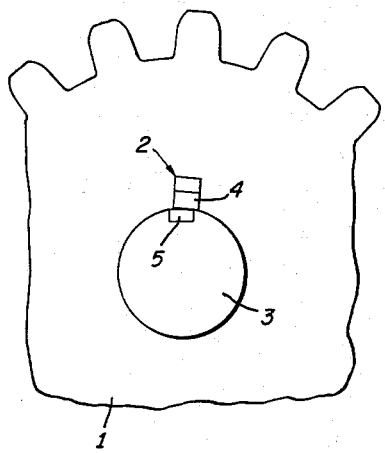
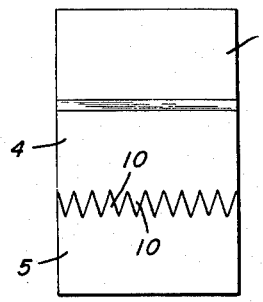
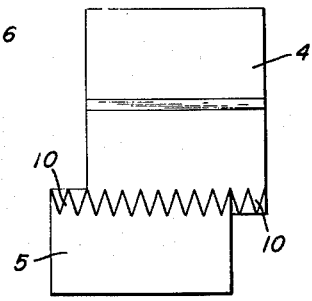
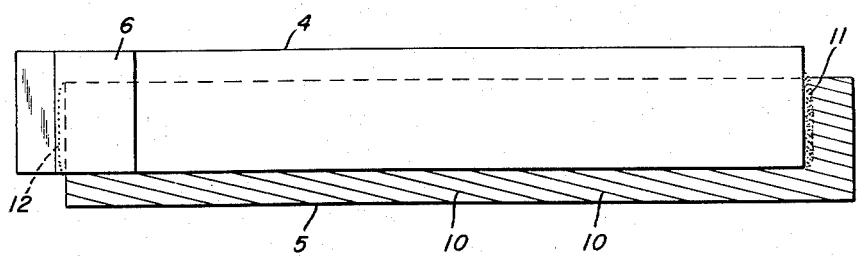
INVENTOR
WERNER C. HALLGREN
By Donald G. Dalton
Attorney ns Patent Office 3,002,773
Patented Oct. 3, 1961

3,002,773
ADJUSTABLE OFFSET KEY ASSEMBLY
Werner C. Hallgren, Lorain, Ohio, assignor to United States Steel Corporation, a corporation of New Jersey
Filed Dec. 9, 1958, Ser. No. 779,090
8 Claims. (Cl. 287—52.05)

This invention relates to a key assembly for connecting driving and driven elements.

It has as its principal object the provision of a key assembly that enables adjustment of the relative positions of driving and driven elements connected thereby. To this end, the key assembly of this invention comprises a pair of superimposed key parts which are respectively adapted for insertion in keyways in a pair of driving and driven elements. Facing surfaces on the superimposed key parts have abutting engagement with each other and are defined by parallel serrations or teeth which have meshing engagement to provide a drive connection between the key parts. The teeth on the key parts are adapted to have meshing engagement in different lateral positions of adjustment of the key parts relative to each other so that the key assembly is effective as a connection between driving and driven elements in positions in which keyways therein are displaced relative to each other.

Other objects and advantages of the invention will become apparent from the following description.

In the drawings, there is shown a preferred embodiment of the invention. In this showing:

FIGURE 1 is a fragmentary and somewhat diagrammatic end elevational view showing the manner in which the key assembly of this invention provides a driving connection between a chain sprocket wheel and a drive shaft therefor;

FIGURE 2 is a side elevation of the key assembly shown in FIGURE 1;

FIGURE 3 is a plan view and FIGURE 4 is an end view looking from the left of the key assembly shown in FIGURE 2;

FIGURE 5 is a view similar to FIGURE 4 illustrating the manner in which the parts of the key assembly are adjustable laterally relative to each other; and FIGURE 6 is a plan view showing a further position of adjustment of the parts of the key assembly of this invention.

Mechanical drives frequently require adjustment of the relative positions of driven parts thereof to compensate for wear. Conveyors for hot pipe which have laterally spaced pushers on parallel conveyor chains furnish an example of drive apparatus requiring an adjustment of this character. When the pushers get out of line due to stretch and wear of the chain drive links, they must be realigned to prevent bending of the hot pipe engaged thereby. Such realignment may be effected readily by the key assembly of this invention by its provision for adjustment of the relative angular position of the chain drive sprocket on its drive shaft. FIGURE 1 of the drawings shows a fragmentary portion of a chain drive sprocket 1 in a conveyor apparatus of this character and the manner in which the key assembly of this invention, designated as a whole by the numeral 2, connects it in driving relation on a drive shaft 3.

As best shown in FIGURES 2–4, the key assembly comprises upper and lower key parts 4 and 5 which are arranged in superimposed relation and are respectively adapted for insertion in the usual keyways extending axially of the sprocket wheel 1 and drive shaft 3 in which they are formed. The upper part 4 is a gib key which is adjustable to different lateral positions relative to the lower part 5 for adjusting the angular position of the sprocket wheel 1 on the drive shaft 3 to compensate for wear. The outer end of the key part 4 has the usual head 6 for abutting against the face of the sprocket 1 to limit its axial movement in the sprocket keyway. The upper surface 7 of the key 4 has a taper in a downward direction to the right as viewed in FIGURE 2 for wedging the key assembly in position when it is driven axially into its final operating position. The lower key part 5 is received in the usual keyway provided in the drive shaft 3.

Opposed facing surfaces 8 and 9 on the key parts 4 and 5 have abutting engagement with each other when they are assembled in superimposed positions as shown in the drawings. Each of the surfaces 8 and 9 is defined by parallel V-shaped serrations or teeth 10 which have meshing engagement with each other and provide a drive connection between the parts 4 and 5. As will be apparent from FIGURES 4 and 5, the teeth 10 have meshing engagement in different lateral positions of adjustment of the parts 4 and 5 relative to each other to provide for angular adjustment of the relative positions of the sprocket wheel 1 and drive shaft 3. The teeth 10 extend in a direction generally lengthwise of the parts 4 and 5 and transversely with respect to the direction of rotational movement of the elements 1 and 3 connected by the key assembly. In a preferred embodiment of the invention, as best shown by the dotted lines in FIGURE 3, the teeth 10 are inclined at an acute angle of approximately 14° relative to the longitudinal axis of the key parts 4 and 5 or with respect to the axis of the shaft 3 for a purpose to be described. The lower key part 5 has a depth such that the teeth 10 on its surface 9 are positioned above the surface of the shaft 3 to enable axial movement of the assembly to its operative driving position when the upper part 4 is displaced laterally with respect to the part 5 as shown in FIGURE 5. While the normal clearance between the shaft 3 and sprocket 1 is sufficient to permit axial movement of the teeth 10 on the lower key part 5 over the surface of the opening in the sprocket 1 without any binding action, the sprocket 1 may be undercut along opposite edges of the keyway therein to provide additional clearance.

The key assembly 2 may be used either as original equipment or as a replacement for conventional solid keys after wear has taken place and adjustment of the parts driven thereby is required. When adjustment is required, the drive key is removed, so that the angular position of the sprocket wheel 1 may be adjusted relative to the drive shaft 3. The key parts 4 and 5 are then assembled in superimposed relation with the gib key 4 occupying a lateral position with respect to the bottom key 5 corresponding to the lateral displacement of the keyways in the sprocket wheel 1 and drive shaft 3 produced by their adjustment. The key parts 4 and 5 thus assembled are then inserted loosely in the keyways, and a final adjustment of the position of the parts 1 and 3 is effected by moving the key parts 4 and 5 in an endwise direction relative to each other. This produces a camming action by reason of the angular inclination of the teeth 10 referred to above which rotates the sprocket wheel 1 relative to the drive shaft 3 in a rotational direction depending upon the key part that is moved. After the final adjustment of the key parts 4 and 5 has been effected in this manner, they are removed and secured against further relative movement by applying weld beads 11 and 12. The key assembly 2 is then reinserted in the keyways and driven home to its final operating position.

If the final adjustment provided by the angular inclination of the teeth 10 as shown in FIGURE 3 is not desired, the key parts 4 and 5 may be formed with teeth 10 thereon extending in a direction parallel to the axis of the shaft 3. In this respect, it will be understood that the angular inclination of the teeth 10 with respect to the axis of the shaft 3 represents the preferred practice of the invention.

While the invention has been shown and described as applied to the sprocket wheel of a chain conveyor drive, it will be understood that it is applicable to other forms of mechanical drives including those in which the driving and driven elements have a rectilinear instead of a rotary motion. Other adaptations and modifications of the invention may be made without departing from the scope of the following claims.

I claim:

1. A key assembly for connecting a pair of driving and driven elements comprising a pair of key parts respectively adapted for insertion in keyways in said elements, said key parts being arranged in superimposed relation and having parallel teeth on opposed facing surfaces thereof, said teeth having meshing engagement and forming a driving connection between said key parts in different lateral positions of adjustment relative to each other.

2. A key assembly as defined in claim 1 characterized by said teeth being inclined at an acute angle relative to the longitudinal axis of said key parts to provide for their lateral adjustment in response to endwise movement of one relative to the other.

3. A key assembly as defined in claim 2 characterized by a connection securing said key parts against movement out of their adjusted positions.

4. In combination with a pair of driving and driven elements having keyways therein, a key assembly for connecting said elements comprising a pair of superimposed key parts respectively received in said keyways and having parallel teeth on opposed facing surfaces thereof, the teeth on said surfaces having meshing engagement and forming a driving connection between said key parts in different lateral positions of adjustment relative to each other.

5. A key assembly providing for adjustment of the relative positions of a pair of driving and driven elements connected thereby comprising a pair of key parts arranged in superimposed positions with opposed facing surfaces thereon in abutting engagement, said surfaces being defined by parallel sets of teeth having meshing engagement with each other and forming a driving connection between said key parts in different positions of adjustment relative to each other.

6. A key assembly comprising, in combination with a pair of concentric driving and driven elements having axially extending keyways therein, a pair of longitudinally extending key parts respectively received in said keyways, said key parts being arranged in superimposed relation and having opposed facing surfaces in abutting engagement with each other, and means comprising parallel sets of teeth respectively on said opposed facing surfaces, said sets of teeth having meshing engagement and forming a driving connection between said key parts in different lateral positions of adjustment relative to each other.

7. A key assembly as defined in claim 6 characterized by said teeth being inclined at an acute angle relative to the longitudinal axis of said key parts to provide for their lateral adjustment in response to endwise movement of one relative to the other.

8. A key assembly comprising, in combination with a pair of concentric driving and driven elements having axially extending keyways therein, a pair of longitudinally extending key parts respectively received in said keyways, said key parts being arranged in superimposed relation and having opposed facing surfaces in abutting engagement with each other, and means on said opposed facing surfaces for securing said key parts in different lateral positions of adjustment relative to each other to form a driving connection between said driving and driven elements and to provide for adjustment of the relative angular positions of said driving and driven elements.

References Cited in the file of this patent

UNITED STATES PATENTS

| | | |
|---|---|---|
| 1,449,341 | Mills et al. | Mar. 20, 1923 |
| 1,816,552 | Trusler | July 28, 1931 |

FOREIGN PATENTS

| | | |
|---|---|---|
| 393,473 | Great Britain | June 8, 1933 |